United States Patent
Hsieh

(10) Patent No.: US 6,622,337 B2
(45) Date of Patent: Sep. 23, 2003

(54) WIPER BLADE FOR A CAR

(76) Inventor: Chih Chin Hsieh, 7F, No. 16-5, Jian Kang Road, Taipei (TW)

( * ) Notice: Subject to any disclaimer, the term of this patent is extended or adjusted under 35 U.S.C. 154(b) by 91 days.

(21) Appl. No.: 09/832,003

(22) Filed: Apr. 11, 2001

(65) Prior Publication Data

US 2002/0129458 A1 Sep. 19, 2002

(30) Foreign Application Priority Data

Mar. 14, 2001 (TW) ........................... 90203772 U

(51) Int. Cl.⁷ .................... B60S 1/38; B60S 1/48
(52) U.S. Cl. ................. 15/250.03; 15/250.41; 15/250.48
(58) Field of Search ............. 15/250.4, 250.41, 15/250.48, 250.361, 250.04, 250.03, 245

(56) References Cited

U.S. PATENT DOCUMENTS

| | | | | |
|---|---|---|---|---|
| 4,019,216 A | * | 4/1977 | Priesemuth | 15/250.41 |
| 4,327,457 A | * | 5/1982 | Lunsford | 15/250.41 |
| 4,616,060 A | * | 10/1986 | Killgoar, Jr. | 15/250.48 |
| 4,754,517 A | * | 7/1988 | Aldout | 15/250.41 |
| 5,406,672 A | * | 4/1995 | Hipke | 15/250.41 |
| 5,778,483 A | * | 7/1998 | Dawson | 15/250.41 |

FOREIGN PATENT DOCUMENTS

| | | | | |
|---|---|---|---|---|
| DE | 2412408 | * | 9/1975 | 15/250.4 |
| DE | 2707703 | * | 8/1978 | 15/250.41 |
| DE | 2700527 | * | 9/1978 | 15/250.4 |
| DE | 3205573 | * | 6/1983 | 15/250.41 |

* cited by examiner

Primary Examiner—Gary K. Graham
(74) Attorney, Agent, or Firm—Troxell Law Office PLLC

(57) ABSTRACT

A wiper blade for a car comprises a seat part, a moisture absorptive part, and a sweep part. The seat part is an elongated strip made of non-absorptive material and provides a cross section and a length thereof corresponding to a wiper frame on the car for joining with the wiper frame. The moisture absorptive part is made of water absorbable material and has a length and a width thereof corresponding to the seat part for joining with the seat part. The sweep part is an elongated strip with a gap and has a size corresponding to the absorptive part for joining with the absorptive part. The moisture absorptive part can keep the sprayed water for next wipe as soon as the sweep part removes the foreign substances on a windshield of the car.

5 Claims, 2 Drawing Sheets

WIPER BLADE FOR A CAR

BACKGROUND OF THE INVENTION

1. Field of the Invention

The present invention relates to a wiper blade for a car, and particularly to an improvement of wiper blade used on a car.

2. Description of Related Art

It has been a long period of time for a car being a tool of ride instead of walk or a tool of transportation. Undoubtedly, the car gives our daily lives and industrial and commercial activities much conveniences and it makes the distance between us short substantially.

The windshield wiper is one of essential accessories on a car and it performs a function of cleaning the windshield. Especially, the dirt and dust may attach to the windshield while the car is driven during raining to influence the visual line. The mosquito and moth are frequent to impact the windshield so as to stain thereon while the car is driven at night or to pass by a wild area such as agricultural zone, or forest zone so that it is hard to remove them. In addition, droppings of wild birds also constitute stains on the windshield. For experienced drivers, it is believed that they have been affected by the preceding drawbacks. Hence, the windshield wiper becomes an important apparatus for cleaning the foreign substances staining on the windshield.

The conventional wiper provides an elongated wiper frame or a set of wiper frames and a sweep part, i.e., the wiper blade is mounted on the wiper frame with a scratching strip. The wiper blade and the scratching strip are made of EPDM and scratching strip assists the wiping movement so as to remove the water residue completely. Thus, as soon as the driver actuates the spraying device over the windshield, the sweep part is used for cleaning the windshield and then the scratching strip at a lateral side of the wiper frame or provided independently can make a sweep afterward to remove the water residue stayed on the windshield.

Although the preceding way to clean the windshield can perform the function of eliminating the water thereon basically, there is a defect that the EPDM is unable to absorb the water. Hence, part of water sprayed on the windshield can be cleaned and the rest of water is removed by way of the scratching strip. It can be realized that the sprayed water is only utilized once and it is a kind of waste for the limited sprayed water, and it is unfavorable for a long way drive for a car. Especially, the sprayed water is mixed with expensive cleaning agent and the loss of sprayed water means wasting the precious resource. In addition, it is necessary to clean the windshield once more and more in order to clean the pollute strongly stained on the windshield.

SUMMARY OF THE INVENTION

An object of present invention is to provide a wiper blade for a car, which is possible to absorb the sprayed water for further wipes so as to save the limited sprayed water prepared in the car.

BRIEF DESCRIPTION OF THE DRAWINGS

The present invention can be more fully understood by referring to the following description and accompanying drawings, in which.

DETAILED DESCRIPTION OF THE PREFERRED EMBODIMENTS

Figure 2:
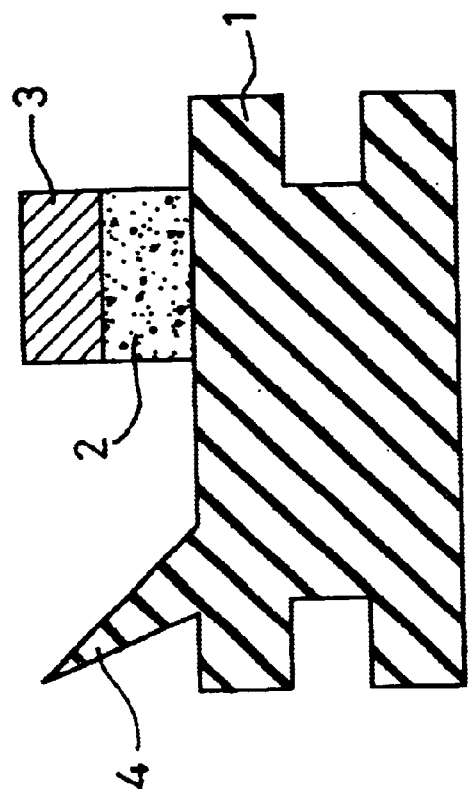
FIG. 2 is a sectional view of wiper blade being attached to a windshield wiper with a scratching strip according to the present invention in a embodiment thereof.
Figure 1:
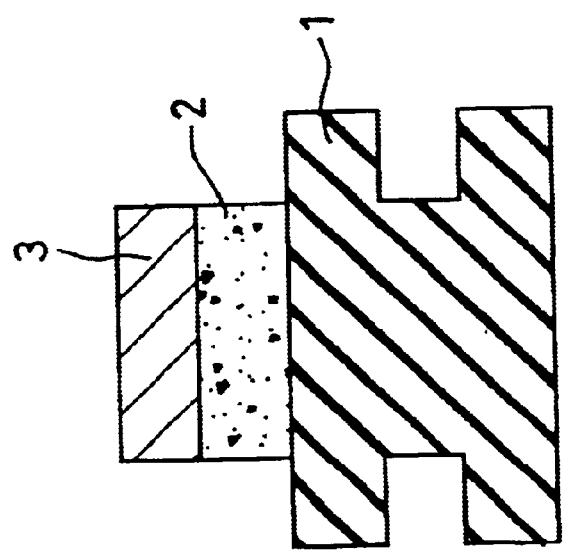
FIG. 1 is a sectional view of wiper blade being attached to a windshield wiper without a scratching strip according to the present invention.
Figure 3:
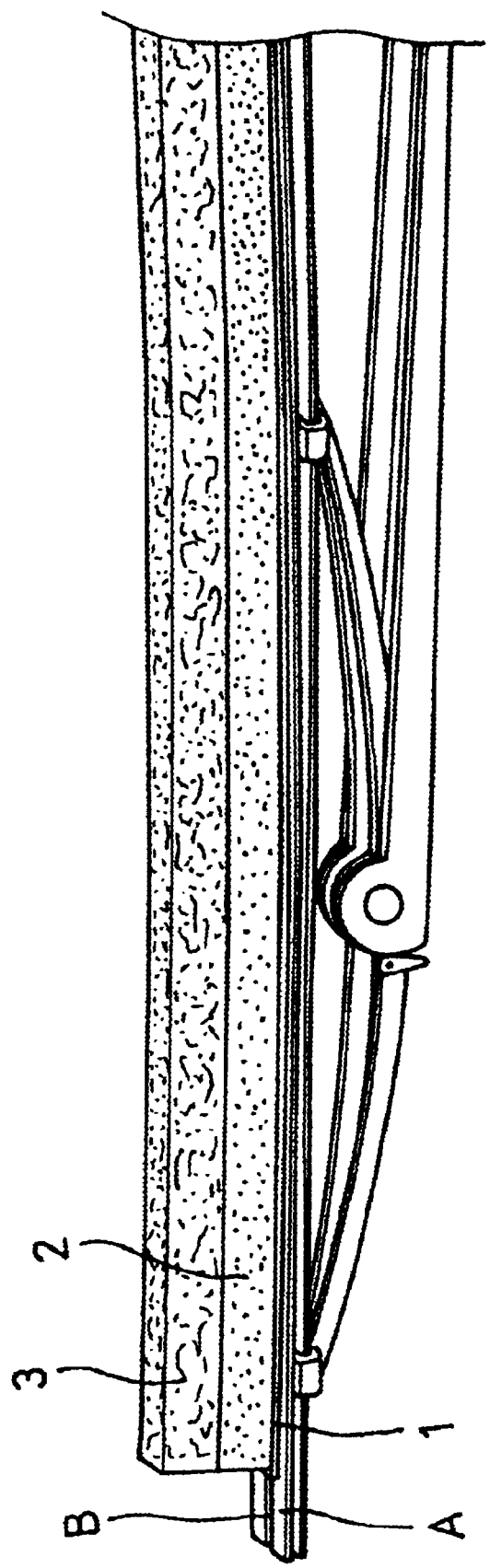
FIG. 3 is a fragmentary perspective view of wiper with wiper blade thereon according to the present invention.

Referring to FIGS. 1, 2, and 3, an improvement of wiper blade according to the present invention basically resides in that the wiper blade can absorb the sprayed water for further use of next wipe or subsequent wipes so that the wiper of present invention comprises a seat part 1, a moisture absorption part, and a wipe part 3.

Wherein, the seat part 1 is made of hard and non-absorptive material such as EPDM. The seat part 1 is an elongated strip and provides a cross section thereof corresponding to a wiper frame so as to be inserted into or joined to the wiper frame for engagement. FIG. 3 shows the wiper blade is inserted into the engaging groove B in the wiper frame A with a conventional way. It is noted that the arrangement in FIG. 3 is an example only and the way of attaching the wiper blade to the wiper frame A completely depends on the shape of seat part 1 on a wiper blade.

The moisture absorptive part 2 is made of water absorbable material such as a sponge and provides a function of keeping some sprayed water such that the sprayed water can release from the absorptive part 2 during next wipe. The absorptive part 2 has a width and a length corresponding to the preceding seat part and can be fixedly attached to the seat part by way of joining of adhesive or the like.

The sweep part 3 is used for contacting with windshield and performing sweep job such that it is made of fiber such as a scratching cloth, which provides clearances between fibers and is frequently used as cleaning cloth, or the like. A facial end of sweep part 3 contacts with windshield and has a flat end surface or an arc end surface. In case of an arc end surface, a central gap may be left between the sweep part 3 and the moisture absorptive part 2.

Referring to FIG. 3 again, the wiper blade at the seat part 1 thereof is fixedly attached to the wiper frame such that the sweep part 3 contacts with the windshield while in use. Once the clean job starts, the water is sprayed over the windshield first and then the wiper blade sweeps the windshield. In this way, the foreign substances on the windshield can be removed and the sprayed water can be absorbed by and kept in the absorptive part 2 for next or further wipes. That is, the water kept in the absorptive part 2 can release to wet the windshield to assist the sweeping operation of sweep part 3.

FIG. 2 shows a scratch part combines with the wiper blade. A scratch strip 4 extends upward in a slant direction and is made of the same material as the seat part 1 without the property of water absorption.

It is appreciated that the present invention allows part of the sprayed water being recycled for further use while the windshield is wiped. The function of further use of sprayed water leads to a well utilization of sprayed water effectively and to prolong the sprayed water prepared in a car or to increase the frequency of use for the water. This is a feature not possible for the conventional wiper to reach feasibly.

While the invention has been described with reference to preferred embodiments thereof, it is to be understood that modifications or variations may be easily made without departing from the spirit of this invention, which is defined by the appended claims.

What is claimed is:

1. A wiper blade consisting of:

an elongated seat part having top and bottom substantially parallel surfaces, the seat part being removably adjoinable to a wiper frame along the bottom surface thereof, the seat part including a single, elongated slanted extension extending in an oblique and tapering manner from the top surface to form a scratching strip;

an elongated moisture absorptive part having top and bottom surfaces, the top surface of the seat part being fixedly adjoined to the bottom surface of the moisture absorptive part; and, an elongated sweep part having a bottom surface, the top surface of the moisture absorptive part being fixedly adjoined to the bottom surface of the elongated sweep part.

2. The wiper blade according to claim 1, wherein the seat part is made of EPDM.

3. The wiper blade according to claim 1, wherein the moisture absorptive part comprises a sponge.

4. The wiper blade according to claim 1, wherein the elongated seat part is slidably insertable into an engagement groove of the wiper frame.

5. The wiper blade according to claim 1, wherein the top surface of the elongated sweep part is flat.

* * * * *